(12) United States Patent
Glad

(10) Patent No.: US 12,307,062 B2
(45) Date of Patent: May 20, 2025

(54) COIL SHIELD OF A CAPACITANCE MODULE

(71) Applicant: Cirque Corporation, Sandy, UT (US)

(72) Inventor: Paul Glad, Sandy, UT (US)

(73) Assignee: Cirque Corporation, Sandy, UT (US)

(*) Notice: Subject to any disclaimer, the term of this patent is extended or adjusted under 35 U.S.C. 154(b) by 0 days.

(21) Appl. No.: 18/665,295

(22) Filed: May 15, 2024

(65) Prior Publication Data

US 2024/0402854 A1 Dec. 5, 2024

Related U.S. Application Data

(63) Continuation-in-part of application No. 18/203,118, filed on May 30, 2023, now Pat. No. 11,989,362.

(51) Int. Cl.
*G06F 3/044* (2006.01)
*G06F 3/01* (2006.01)

(52) U.S. Cl.
CPC ............ *G06F 3/0446* (2019.05); *G06F 3/016* (2013.01); *G06F 2203/04105* (2013.01); *G06F 2203/04107* (2013.01)

(58) Field of Classification Search
CPC ......... G06F 2203/04107; G06F 3/0446; G06F 3/016; G06F 2203/04105; G06F 3/0414; H01F 2007/068

See application file for complete search history.

(56) References Cited

U.S. PATENT DOCUMENTS

| 10,296,091 | B2 | 5/2019 | Heubel | |
|---|---|---|---|---|
| 10,866,642 | B2 | 12/2020 | Rosenberg | |
| 2022/0011868 | A1 | 1/2022 | Junus | |
| 2022/0334645 | A1* | 10/2022 | Junus | G06F 3/045 |
| 2023/0315214 | A1* | 10/2023 | Lochun | H01H 13/85 345/168 |

* cited by examiner

*Primary Examiner* — Temesghen Ghebretinsae
*Assistant Examiner* — Ivelisse Martinez Quiles

(57) ABSTRACT

A capacitance module may include at least one touch electrode on a first surface of the capacitance module; a first portion of an inductance coil deposited on a second surface of the capacitance module; a second portion of the inductance coil deposited on a third surface of the capacitance module; a first coil shield deposited on the second surface of the capacitance module; and a second coil shield deposited on the third surface of the capacitance module; where the first portion of the inductance coil and the second portion of the inductance coil are electrically connected; where the inductance coil is positioned to interact with a magnet adjacent to the inductance coil; and where the first coil shield and the second coil shield are positioned to reduce electromagnetic interference between the inductance coil and other electronic components of the capacitance module.

19 Claims, 15 Drawing Sheets

COIL SHIELD OF A CAPACITANCE MODULE

RELATED APPLICATIONS

The present Application is a continuation-in-part of U.S. patent Ser. No. 18/203,118 to Paul Glad, et al., filed on May 30, 2023 and titled "Inductance Coil of a Capacitance Module." U.S. patent Ser. No. 18/203,118 is expressly incorporated by reference herein.

FIELD OF THE DISCLOSURE

This disclosure relates generally to systems and methods for measuring a pressure input and/or providing a haptic response. In particular, this disclosure relates to systems and methods for measuring a pressure input or providing a haptic response on a touch surface of an electronic device with an inductive coil.

BACKGROUND

A touch pad is often incorporated into electronic devices to provide a mechanism for giving inputs to the device. The touch pads may operate using capacitance sensing and/or pressure sensing, which may directly manipulate objects depicted in the screen. Pressure sensors may detect pressure from on the touch pad intended by the user to be control inputs.

An example of a pressure sensor is disclosed in U.S. Pat. No. 10,296,091 issued to Robert W. Heubel, et al. This reference discloses a method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

An inductive method for measuring pressure inputs and providing haptic feedback may be incorporated into a touch pad system.

An example of inductive pressure sensing and haptics is disclosed in U.S. Pat. No. 10,866,642 issued to Ilya D. Rosenberg, et al. This reference discloses a system for detecting and responding to touch inputs with haptic feedback includes: a magnetic element rigidly coupled to a chassis; a substrate; a touch sensor interposed between the substrate and a touch sensor surface; an inductor coupled to the substrate below the touch sensor surface and configured to magnetically couple to the magnetic element; a coupler coupling the substrate to the chassis, compliant within a vibration plane approximately parallel to the touch sensor surface, and locating the inductor approximately over the magnetic element; and a controller configured to intermittently polarize the inductor responsive to detection of a touch input on the touch sensor surface to oscillate the substrate in the vibration plane relative to the chassis.

Another example is disclosed in in U.S. Patent Publication No. 2022/0011868 issued to James Junus, et al. This reference discloses a substrate including: a first layer including a first spiral trace coiled in a first direction: a second layer arranged below the first layer and including a second spiral trace coiled in a second direction and cooperating with the first spiral trace to form a multi-layer inductor; and a sensor layer including an array of drive and sense electrode pairs. The system also includes: a cover layer arranged over the substrate and defining a touch sensor surface; and a first magnetic element arranged below the substrate and defining a first polarity facing the multi-layer inductor. The system further includes a controller configured to drive an oscillating voltage across the multi-layer inductor to oscillate the substrate in response to detecting an input on the touch sensor surface based on electrical values from the set of drive and sense electrode pairs.

Each of these references are herein incorporated by reference for all that they disclose.

SUMMARY

In one embodiment, a capacitance module may include at least one touch electrode on a first surface of the capacitance module; a first portion of an inductance coil deposited on a second surface of the capacitance module; a second portion of the inductance coil deposited on a third surface of the capacitance module; a first coil shield deposited on the second surface of the capacitance module; and a second coil shield deposited on the third surface of the capacitance module; where the first portion of the inductance coil and the second portion of the inductance coil are electrically connected; where the inductance coil is positioned to interact with a magnet adjacent to the inductance coil; and where the first coil shield and the second coil shield are positioned to reduce electromagnetic interference between the inductance coil and other electronic components of the capacitance module.

The magnet may be configured to provide a haptic effect on the capacitance module by moving the inductance coil with a change in a magnetic force.

The first coil shield and/or the second coil shield may be arranged in a ring-like structure around the inductance coil.

The ring-like structure may be a discontinuous ring.

The first coil shield and/or the second coil shield deposited on a surface may be deposited in at least two segments.

The module may include processing resources located on the second surface of the capacitance module where the first coil shield is located between the first portion of the inductance coil and the processing resources.

The module may include a controller and memory, the memory having programmed instructions that, when executed, cause the controller to detect an applied force on the capacitance module by measuring a change in a distance between the inductance coil and the magnet.

The module may include a controller and memory, the memory having programmed instructions that, when executed, cause the controller to impose a varying signal on the inductance coil that interacts with the magnet to provide a haptic effect on the capacitance module.

The first surface may be on a first substrate; the second surface may be on a second substrate; the third surface may also be on the second substrate; another shield coil may be on the third substrate and the third substrate may be located between the first surface and the second surface.

The first coil shield and/or the second coil shield may be made of a conductive material.

The first coil shield and/or the second coil shield may be positioned to overlap with an edge of the inductance coil by a predetermined gap to enhance electromagnetic interference suppression.

The first coil shield may be electrically connected to the second coil shield.

The first coil shield on the second surface and the third surface of the capacitance module may be positioned to focus the electromagnetic energy of the inductance coils towards the magnet.

The module may include a third portion of the inductance coil deposited on a fourth surface of the capacitance module and another coil shield deposited on the fourth surface of the capacitance module; where the another coil shield deposited on the fourth surface is positioned to reduce electromagnetic interference between the inductance coil and other electronic components of the capacitance module.

The first portion of the inductance coil and the second portion of the inductance coil may be connected in series.

The first portion of the inductance coil and the second portion of the inductance coil may be connected in parallel.

The inductance coil and first coil shield and/or the second coil shield may be located near a corner of the second surface.

The first coil shield may be connected to the second coil shield.

The first coil shield and the second shield may be aligned with each other while being on different layers of the capacitance module.

In another embodiment, a capacitance module may include a stack of layers; the stack of layers may include an electrode layer, a shield layer, an inductance coil on the shield layer, and a magnet adjacent to the shield layer; where a coil shield on the shield layer is positioned around the inductance coil.

In another embodiment, a capacitance module may include at least one touch electrode on a first surface of the capacitance module, a first inductance coil, a second inductance coil, and first shield coil; where the first portion of the first inductance coil is deposited on a second surface of the capacitance module and a second portion of the first inductance coil is deposited on a third surface of the capacitance module; where the first portion of the second inductance coil is deposited on the second surface of the capacitance module and a second portion of the second inductance coil is deposited on the third surface of the capacitance module; where the first coil shield is deposited on the second surface and third surface of the capacitance module and positioned to reduce electromagnet interference between the first inductance coil, the second inductance coil, and other electronic components of the capacitance module; where the first inductance coil is positioned to interact with a first magnet adjacent to the first inductance coil and the second inductance coil is positioned to interact with a second magnet adjacent to the second inductance coil.

Figure 1:
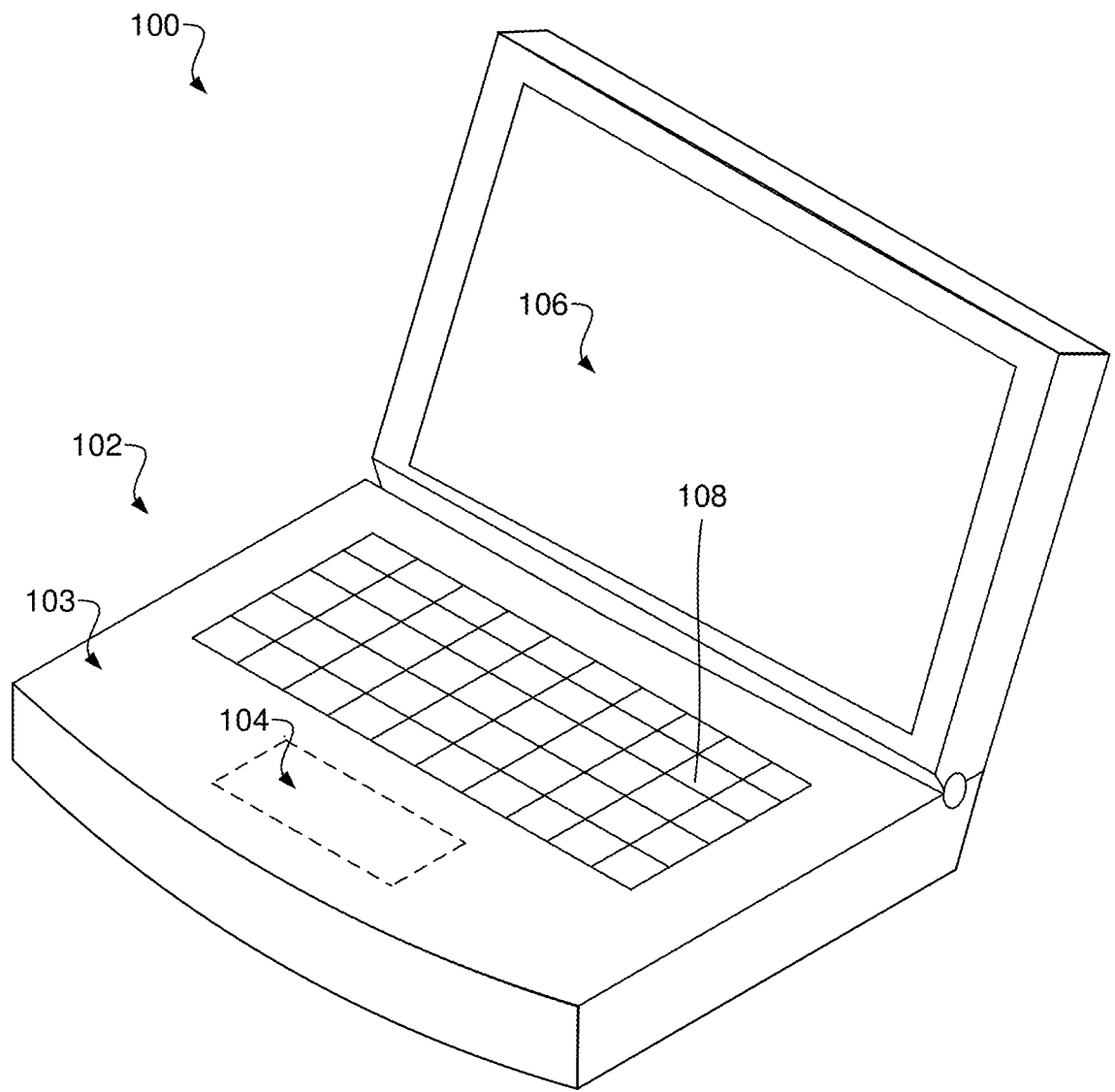
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "inductance coil" may generally refer to an electrical component that may produce a change in a magnetic field when receiving an electrical signal and/or may produce an electrical signal when receiving a change in a magnetic field. In some examples, an inductive coil may be a conductive material wound in a concentric manner. For example, a conductive trace and/or electrode on a substrate that forms a circular pattern may be an inductance coil. In some examples, a change in a magnetic field around the inductance coil may produce an electrical current in the inductance coil. In some examples, applying an electrical current to an inductance coil may change the magnetic field around the inductance coil. In some examples, the inductance coil may be deposited, formed, or otherwise attached to a surface of a layer of a conductive module.

For the purposes of this disclosure, the term "magnet" may generally be defined as a component which may produce a magnetic field. In some examples, a magnet may be a ferromagnetic object and have a permanent or semi-permanent magnetic field. In other examples, a magnet may have a non-permanent or electrically induced magnetic field. For example, an inductive material that may produce a magnetic field when an electrical current is applied to it may be a magnet. In some examples, a magnet may repel or attract other magnets. In some examples, magnets may produce an electrical current in an inductive material when moving adjacent to the material.

For the purposes of this disclosure, the term "haptic response" may generally refer to a force, vibration, motion, or combinations thereof within an electrical device that may be intended to communicate through the sense of touch. In some examples, a haptic response may be produced by an oscillating motion of an object. In some examples, an oscillating object may cause other objects around the object to oscillate or vibrate. In this example, the surface that the user may touch or feel may be caused to vibrate and this is an example of a haptic response.

For the purposes of this disclosure, the term "oscillating enhancement mechanism" may generally refer to a mechanism that may aid a system in preserving and/or enhancing energy in an oscillatory motion. In some examples, an oscillating enhancement mechanism may cause a system to have a resonant frequency for oscillation. In such an example, a system oscillating at a certain frequency with an oscillating enhancement mechanism may oscillate more efficiently than a system without an oscillating enhancement mechanism. For example, a spring attached to a mass may oscillate at a resonant frequency due to the natural properties of the spring. In this example, the spring is an oscillating enhancement mechanism. In some examples, driving a system with an oscillating enhancement mechanism at a certain resonant frequency may cause the oscillation to be amplified. In some examples, the oscillating enhancement mechanism may include a spring, a wave spring, a compression spring, a tension spring, an elastomeric material, another type of mechanism, another type of material, or combinations thereof.

For the purposes of this disclosure, the term "pressure input" may generally refer to a force applied to a surface by an object pressing on the surface at a certain measurable location with a certain measurable force. In some cases, the object may be a finger, a stylus, a palm of a hand or any other object capable of pressing against a surface. In some examples, the location of the pressure input may be a point, a series of points or an area corresponding to the area of the object. For example, a finger may press on a surface of a capacitance module at a certain location and a certain magnitude that may be measured by a pressure sensor. In some examples, multiple magnitudes at multiple locations may be measured as a single pressure input. In other examples, a pressure input may be one magnitude at one location.

For the purposes of this disclosure, the term "connected in series" may generally refer to components or portions of components being electrically connected so that electrical current passes through the portions or components one after another. For example, an inductance coil may have a first and a second portion in which a single connection connects the two portions. In such an example, applying an electrical current to the coil may cause the current to flow through the first portion, across the connection, and through the second portion. In some examples, multiple connections between portions may be used and the coil may still be connected in series.

For the purposes of this disclosure, the term "connected in parallel" may generally refer to components or portions of components being electrically connected so that electrical current passes through portions or components at the same time, or that current may be applied to the portions or components at multiple points of the portions or components. For example, an inductance coil may have a first portion and a second portion. In some examples, a part of the first portion may be connected to multiple parts of the second portion and current may flow from the first part of the first portion to multiple parts of the second portion. In some examples, any number of suitable connections may be used to connect parts of portions and/or portions in series. In some examples, a current may be applied at several points on either portion.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
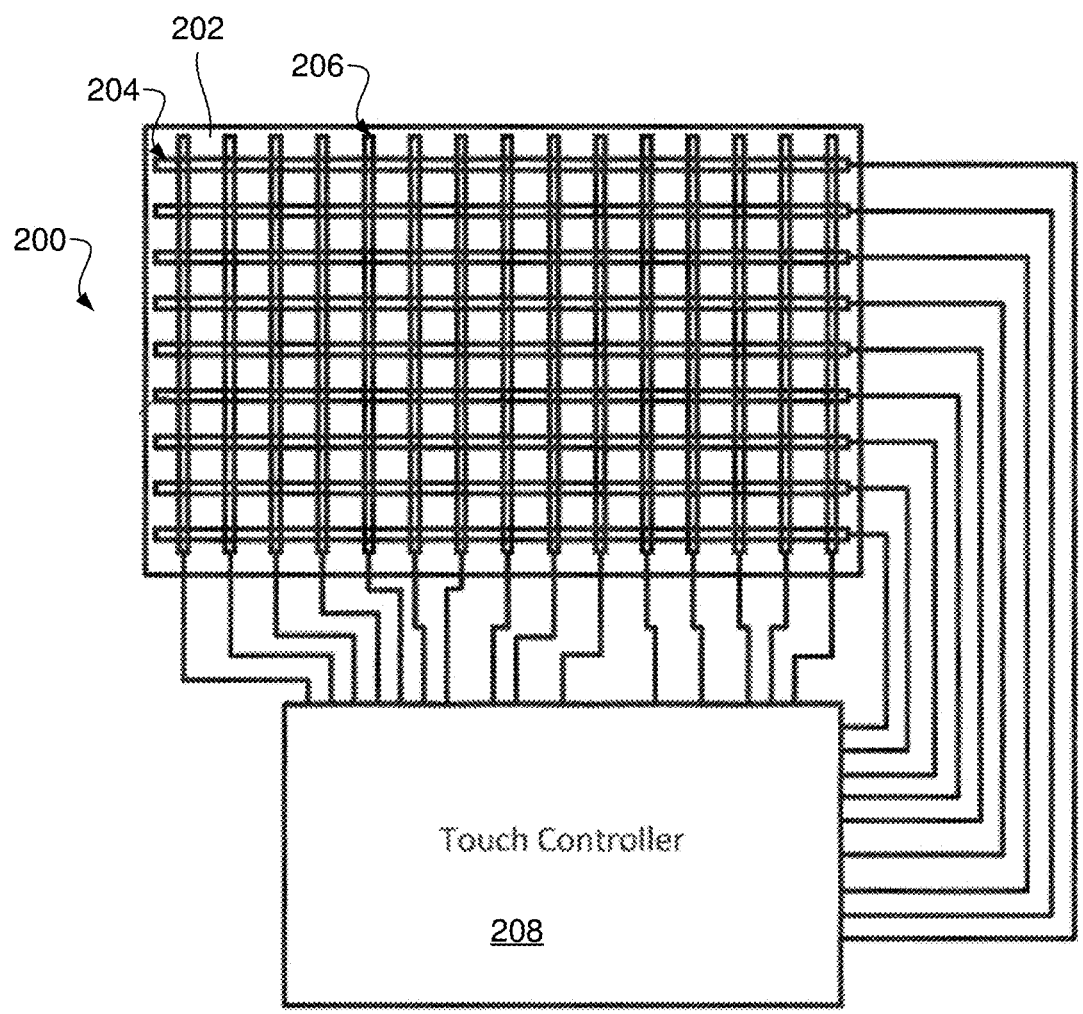
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
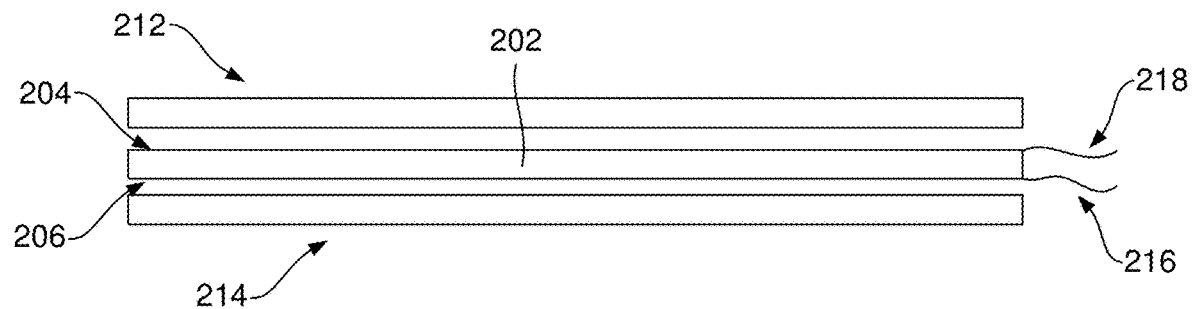
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
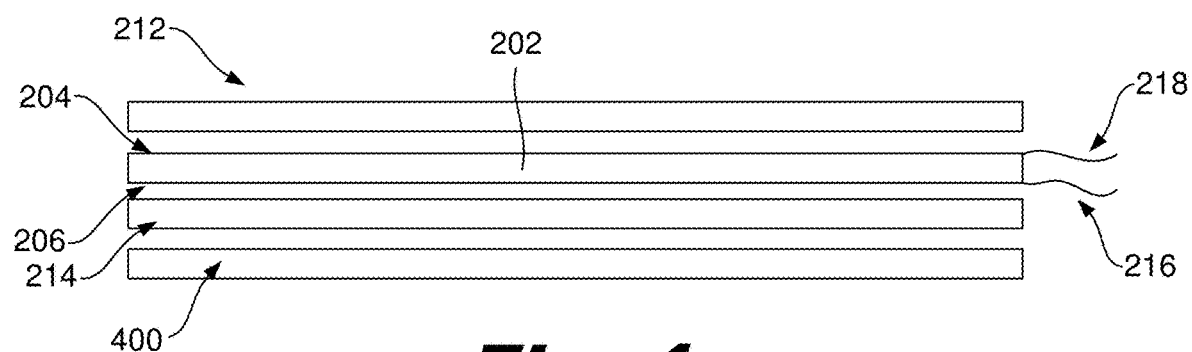
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5A:
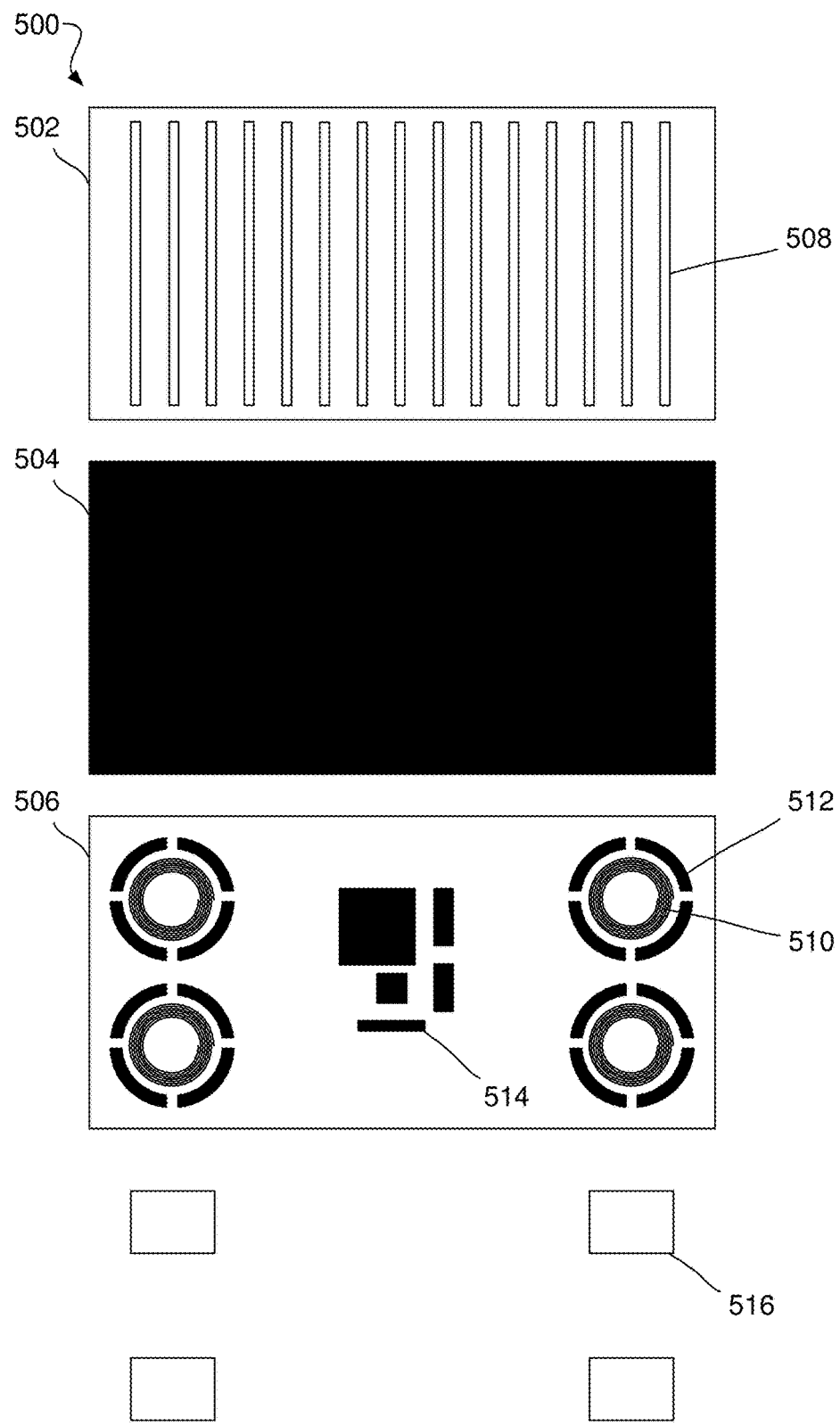
FIG. 5A depicts an example of a capacitance module with a set of magnets in accordance with the disclosure.

FIG. 5A depicts an example of a capacitance module 500 with a set 516 of magnets placed adjacent to the capacitance module 500 so that they are aligned with the inductance coils 510. In this example, the capacitance module 500 includes a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers. While not depicted in FIGS. 5A-5C, the capacitance module may include an additional sensor layer between layers 502 and 504 that includes an additional set of electrodes to be used with set 508 of electrodes on layer 502 to collectively take mutual capacitance measurements.

The sensor layer 502 includes a set 508 of electrodes which may be used in a capacitance circuit to detect and/or measure changes in capacitance. In this example, the sensor layer includes one set of electrodes. In other examples, a sensor layer may include two sets electrodes, three sets of electrodes, or a different number of sets of electrodes. The set of electrodes 508 may operate using self-capacitance. In other examples, electrodes on a sensor layer may operate using mutual capacitance.

The sensor layer 502 may be adjacent to a capacitance reference surface.

The shield layer 504 is adjacent to the sensor layer 502 within the capacitance module 500. In other examples, a shield layer may be in another location relative to other layers in a stack.

The shield layer 504 may be made of a material which blocks or reduces electromagnetic and/or electrical interference. A shield layer may be made of a conductive material such as copper, aluminum, silver, or combinations thereof. A shield layer may be made of a composite material like plastic, glass, another composite structure, or combinations thereof. A shield layer may be a conductive coating applied to a substrate, such as indium tin oxide (ITO), graphene, a conductive polymer, another coating, or combinations thereof. In some cases, the shield layer may be made of a magnetic material, such as iron, ferrite, another metal, composites thereof, alloys thereof, mixtures thereof, or combinations thereof.

In this example, the shield layer 504 is located between the sensor layer 502 and the component layer 506. The shield layer 504 may help prevent electromagnetic interference originating from components on the components layer 506 from interfering with the set 508 of electrodes on the sensor layer 502.

Shielding the sensor layer 502 with the shield layer 504 may improve the accuracy and stability of capacitance measurements measured by the set 508 of electrodes. Shielding the sensor layer 502 may also reduce noise, which may increase the sensitivity and accuracy of user inputs on the capacitance module. The shielding layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504 and the set 516 of magnets. In other examples, a component layer may be in another location relative to other layers in a stack or parts of a capacitance module. The component layer 506 includes a set of inductance coils 510, a set of coil shields 512, and other components 514.

Components 514 included on the component layer 506 may facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

The component layer 506 includes a set of inductance coils 510 positioned to interact with the set of magnets 516 adjacent to the component layer. In this example, the component layer 506 includes four inductance coils 510 and four magnets 516. Each inductance coil 510 may correspond to a magnet 516. In other examples, a component layer may include a different number of inductance coils and/or magnets.

An inductance coil 510 may interact with a magnet 516 to provide a haptic response. In some examples, this haptic response may be provided by changing the magnitude and/or direction of a magnetic field related to a component of a capacitance module. In such an example, the change in the magnitude and/or direction of a magnetic field related to a first component may interact with a magnetic field related to a second component which may cause a movement in a component of the capacitance module.

In some examples, a haptic response may be provided by applying an electrical signal to an inductance coil to change the magnitude and/or direction of a magnetic field related to the inductance coil. In such an example, the change in the magnetic field may cause the inductance coil to move due to being repelled and/or attracted with a magnetic field related to the inductance coil's corresponding magnet.

In other examples, a magnet may be an electromagnet. In such an example, an electrical signal may be applied to the magnet, which may change the magnitude and/or direction of a magnetic field related to the magnet, which may cause its corresponding inductance coil to move due to being repelled and/or attracted with the magnetic field related to the magnet.

The set of inductance coils 510 and the set of magnets 516 may interact with each other to detect a pressure input affecting the capacitance module 500. In some examples, a pressure input to a capacitance module may move the capacitance module, moving an inductance coil in relation to its corresponding magnet. This may cause a change in the electrical properties of the inductance coil. In some examples, a change in the electrical properties of the inductance coil may include a change in the measured current of the inductance coil caused by a change in the magnetic field related to the inductance coil affected by the change in position of the magnet corresponding to the inductance coil. In some examples, the change in the measured current of an inductance coil may be used to determine the pressure of a pressure input.

In some examples, the inductance coils of the set 510 may be traces, electrodes, conductors, and/or a wires disposed on a two-dimensional surface of the component layer 506. In such an example, the coil material may be disposed on the component layer in a pattern or shape in which applying an electrical signal to the conductive material may cause a change in the magnetic field around the material. In some examples, the conductive material may be disposed in a concentric pattern. In some examples, applying an electrical signal to the conductive material may change the magnetic field in a direction perpendicular to the surface of the component layer 506 on which the conductive material is disposed. In some examples, the magnets of the set 516 may be aligned with the center of the shape or pattern formed by the disposed conductive material. In some examples, the change in a magnetic field caused by the application of an electrical signal to the conductive material disposed on the component layer 506 may be aligned with the magnetic field of the magnets of the set 516. In such an example, applying a first electrical signal may cause the aligned magnetic fields to have a magnitude in the same direction and applying a second electrical signal may cause the aligned magnetic fields to have a magnitude in an opposing direction. By oscillating between applying the first and second electrical signals, the aligned magnetic fields may oscillate between having the same direction and having an opposite direction, which may cause the inductance coils of the set 510 and the magnets of the set 516 to oscillate between repelling each other and attracting each other. In some examples, the magnets may be fixed, and such an oscillation may cause a haptic response in the capacitance module 500.

In some examples, the coil material of an inductance coil may be disposed on a substrate in a specific pattern or shape. The pattern or shape of the inductance coil may have an effect on the relationship between the inductance coil's magnetic field and its electric field. In these examples, the movement of a corresponding magnet may cause a change in the measured current and/or voltage of the inductance coil. In such an example, movement of the capacitance module may be determined by the change in the measured current and/or voltage of the inductance coil.

In some examples, a pressure applied to a reference surface may cause a capacitance module to move in relation to magnets. In such an example, the magnetic field affecting inductance coils of the capacitance module may change, causing the measured voltage and/or current in the inductance coil to change. This change in measured voltage and/or current may be used to determine that a pressure has been applied to a reference surface of the capacitance module. In some examples, the change may also determine the magnitude, location, amount, size, or any other characteristic of the pressure applied to the reference surface.

In the depicted example, the capacitance module 500 has four inductance coils 510 and four magnets 516. Each inductance coil 510 and corresponding magnet 516 may be used individually to provide haptic responses at certain locations on the capacitance module 500. In some examples, multiple magnet-coil pairs may be used together to provide a larger haptic response and/or provide a haptic response at a certain location. In some examples, multiple magnet-coil pairs may be used to determine the magnitude and/or location of a pressure input applied to the capacitance module 500. In such an example, measured current and/or voltage changes in the different magnet-coil pairs may be used, and the difference between the measured changed may determine the magnitude and/or location of the applied pressure.

Each inductance coil 510 on the component layer 506 is encompassed by a coil shield 512. The coil shields 512 may be made of a material which blocks or reduces electromagnetic, magnetic, and/or electrical interference, such as copper, aluminum, silver, iron, ferrite, plastic, glass, a coating material, mixtures thereof, alloys thereof, or combinations thereof.

The coil shields 512 may reduce electromagnetic interference between the inductance coils 510 and the components 514 on the component layer 506. In some examples, reducing electromagnetic interference between an inductance coil and a component may reduce the increase the accuracy of signals measured on the inductance coil. In other examples, reducing electromagnetic interference may increase the reliability of components on a component layer. In both examples, reducing electromagnetic interference may increase the overall performance of a capacitance module.

The coil shields 512 may focus the electromagnetic energy of the inductance coils 510 towards the magnets 516 adjacent to the component layer 506. In some examples, focusing the electromagnetic energy of an inductance coils may reduce the overall electrical power required to provide a haptic effect with the inductance coil and a corresponding magnet. In other examples, focusing the electromagnetic energy may reduce overall electrical power required to detect a pressure input. In some examples, the coil shield may prevent power from the coils to be drained into another metal components in the capacitance module or drained by objects that are positioned adjacent to and external of the capacitance module. The shield coils may be designed to minimize and/or prevent the formation of eddy currents. By minimizing and/or preventing the formation of eddy currents, the less power my be leaked into the surrounding components of the capacitance module. By lowering the amount of power that is leaked into the other components of the capacitance module, more power from the inductance coils may be focused towards the magnets.

The coil shields 512 may absorb thermal energy radiated by the inductance coils 512. In some examples, absorbing thermal energy from the inductance coils may protect other components on a component layer, improving the durability and longevity of a capacitance module.

The coil shields 512 may enable components 514 to be placed closer to the inductance coils 512 on the component layer 506. Because coil shields may reduce electromagnetic interference, components may be placed closer to inductance coils without consideration of the inductance coils' electromagnetic and/or thermal radiation, increasing design flexibility of a capacitance module.

Figure 5B:
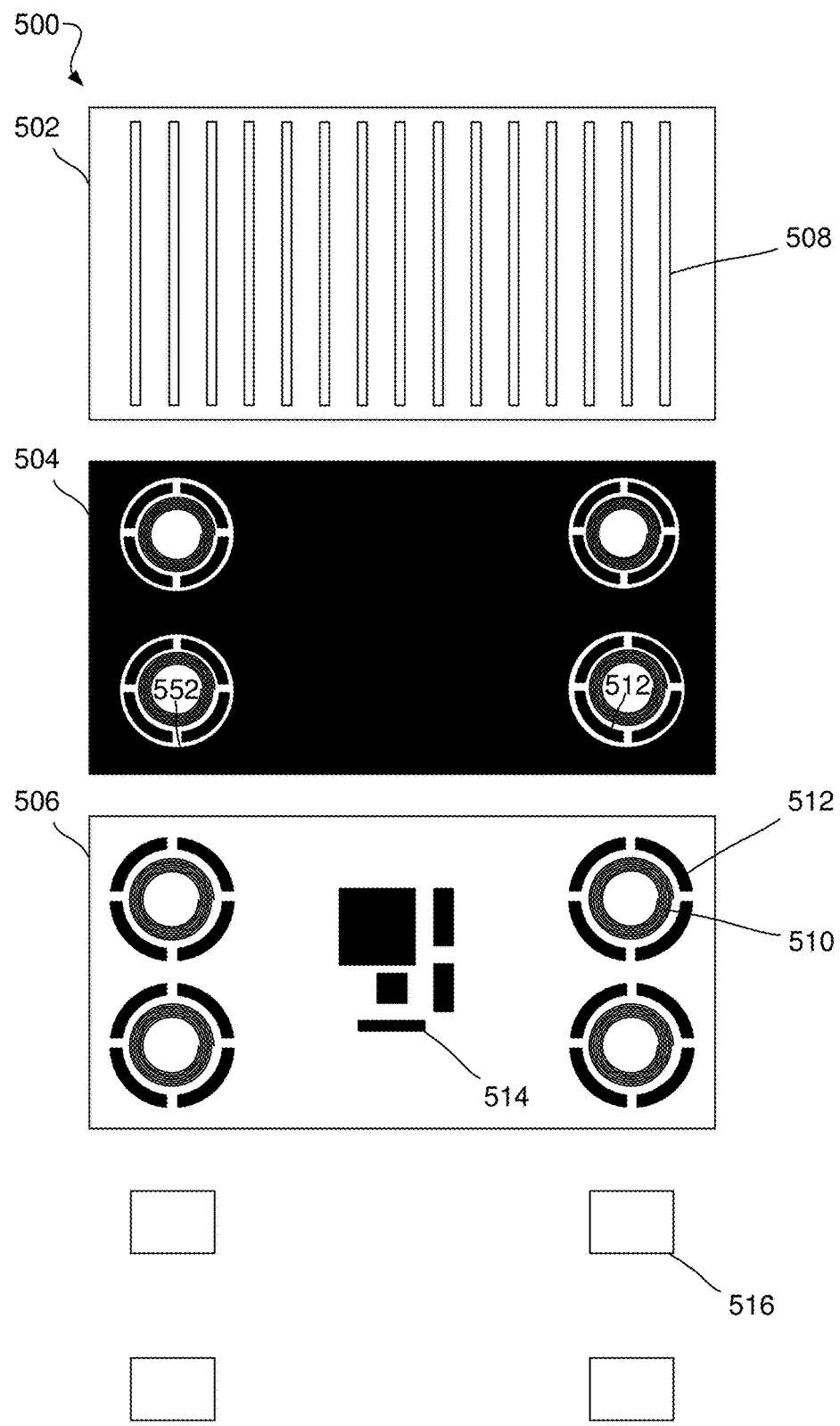
FIG. 5B depicts an example of a capacitance module with inductive coils in a shield layer in accordance with the disclosure.

FIG. 5B depicts an example where the coil shields 512 are also located on the shield layer 504. In this example, the coil shields 512 may minimize and/or prevent eddy currents from forming in the shielding material of the shield layer. In some examples, the coil shields 512 may be made of the same or a different material than the shielding material of the shield layer 504. For example, the coil shield may be made of a ferrite and the shield layer may include a copper, nickel, or other electrically conductive material. However, in other embodiments, both the coil shields and the shieling material of the shield layer may both be made of the same material, such as a copper material.

In some examples, the coil shield may be shaped to prevent the formation of eddy currents within the coil shield. For example, the coil shield may be discontinuous in at least one location so that the coil shield does not allow a continuous flow of electrical current to flow around the inductance coil. In this way, the transfer of electrical power from the inductance coils to the coil shield and/or the shielding material of the shield layer is reduced and/or eliminated.

The coil shields may be electrically isolated from the shielding material of the shield layer. A gap 552 may electrically insulate the coil shields from the shield layer.

Figure 5C:
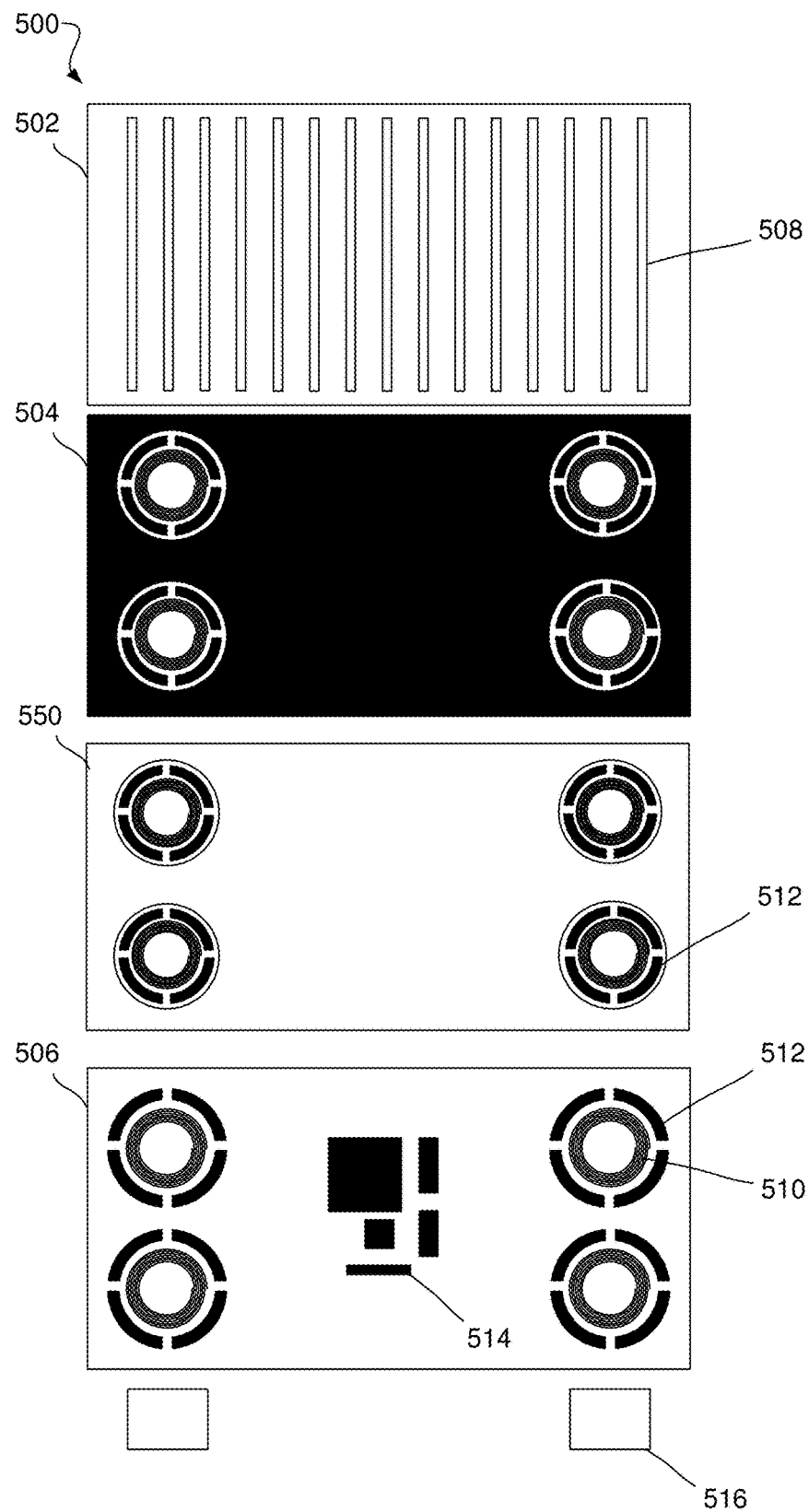
FIG. 5C depicts an example of a capacitance module with inductive coils spanning three substrates in accordance with the disclosure.

FIG. 5C depicts an example of an additional substrate 550 in the capacitance module. The additional substrate 550 may also include coil shields 512 and inductance coils 510. Each of the inductance coils 510 on each layer may be aligned with the inductance coils in the same corner by on different layers. These inductance coils may be electrically connected. In some examples, these inductance coils may be connected in parallel or in series. The coil shields may be electrically connected to the other coil shields on different layers and in the same corner. However, in other embodiments, the shield coils are not electrically connected to the coil shield on the same layer and/or on different layers. In such examples, the coil shields may be electrically floating.

In the depicted example, each of the coil shields in a first corned of the first layer, the second layer, and the third layer are aligned with each other. Likewise. the coil shields of the second corner are aligned with each other. The coil shields of the third corner are aligned with each other. The coil shields of the fourth corner are aligned with each other. In some embodiments, the alignment of the coil shields on different substrates and/or layers may enhance the ability of the coil shields to collectively minimize and/or reduce the interference on various parts of the capacitance module that would otherwise be formed by the inductance coils.

Figure 6A:
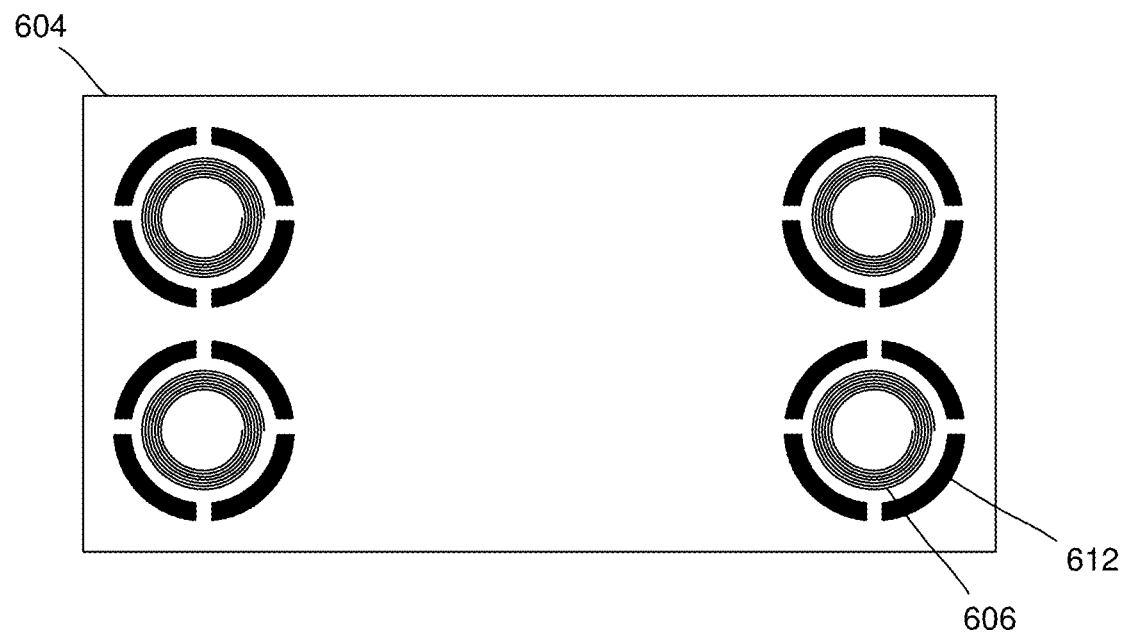
FIG. 6a depicts an example of a substrate with a set of inductive coils and coil shields in accordance with the disclosure.

FIG. 6a depicts an example of a substrate 604 in accordance with the disclosure. In this example, one side of the substrate 604 is depicted. The substrate 604 includes a set of inductance coils 606, each surrounded by a coil shield 612.

Figure 6B:
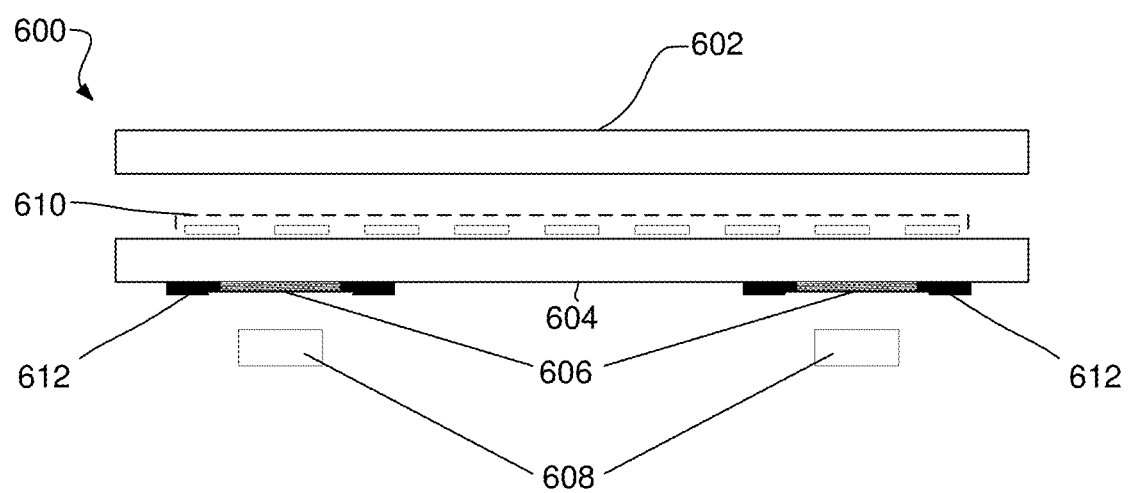
FIG. 6b depicts an example of a cross section of a capacitance module with a set of magnets in accordance with the disclosure.

FIG. 6b depicts an example of a cross section of a capacitance module 600. The substrate 604 may be located adjacent to a capacitance reference surface 602, which may or may not be part of the capacitance module. The substrate 604 has a first side with a set of electrodes 610 and a second side with the set of inductance coils 606 and coil shields 612. A set of magnets 608 is positioned adjacent to the set of inductance coils 606 and is aligned with the set of inductance coils 606. In some examples, the set of electrodes 610 may be self-capacitance electrodes and may be used in a capacitance circuit. In some examples, the set of inductance coils 606 and the set of magnets 608 may be positioned so that they may interact with each other but may not interact with the set of electrodes 610.

Figure 7:
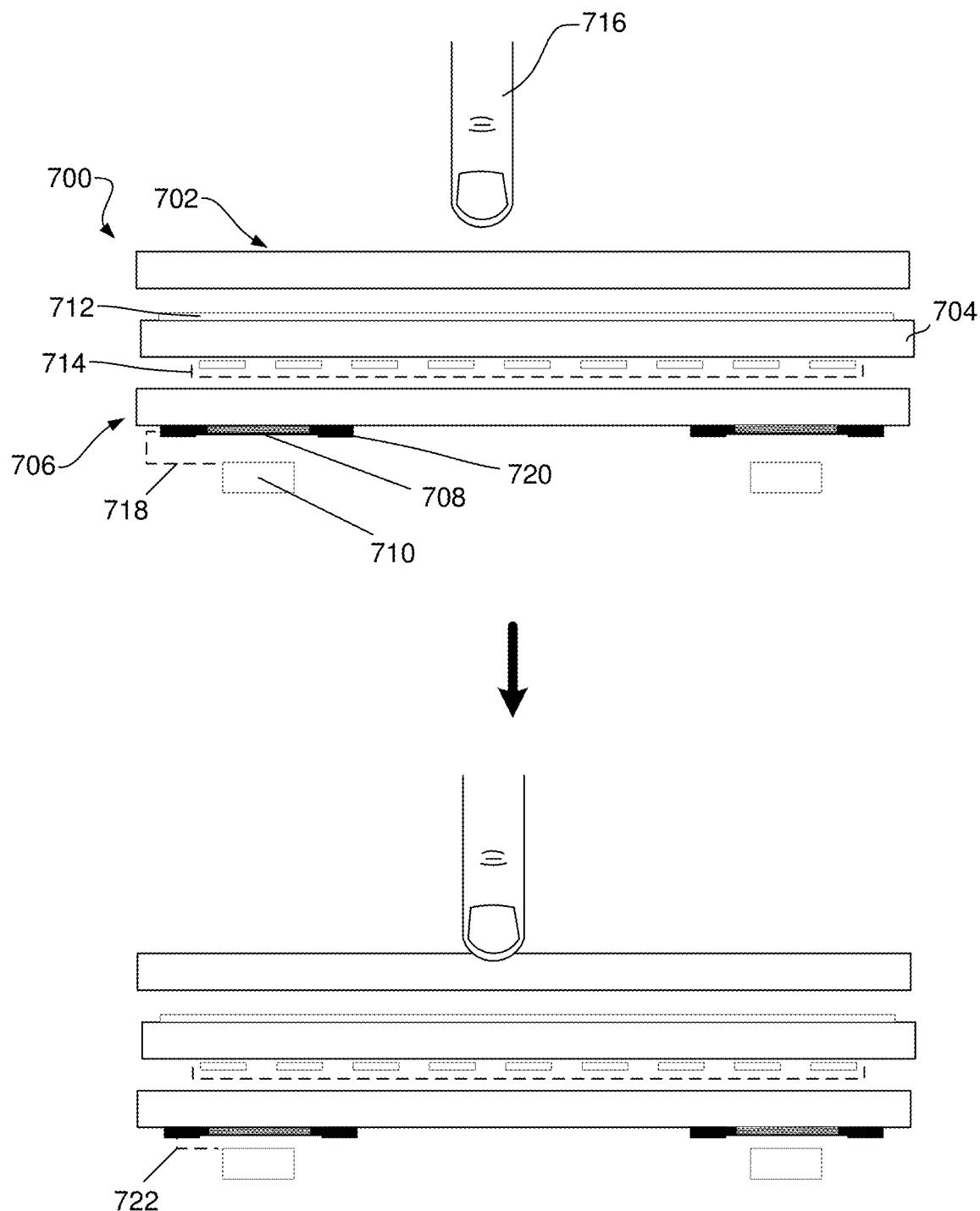
FIG. 7 depicts an example of detecting an applied pressure in accordance with the disclosure.

FIG. 7 depicts an example of detecting an applied pressure. A capacitance module 700 includes a reference surface 702, a first substrate 704, and a second substrate 706. The first substrate 704 may be located between the reference surface 702 and the second substrate 706. The first substrate 704 has a first side with a set of electrodes 712 and a second set of electrodes 714. The second substrate 706 has a first side and a second side. An inductance coil 708 may be disposed on the second side of the second substrate. A coil shield 720 may be disposed around the inductance coil 708 on the second side of the second substrate 706. A magnet 710 may positioned adjacent to the inductance coil at a first distance 718. The object 716 may apply a force to the reference surface 702. The capacitance module 700 may move downward due to the applied force which moves the inductance coil 708 toward the magnet 710 until it arrives at a second distance 722 from the magnet.

In this example, the distance between the inductance coil 708 and the magnet 710 begins at the distance 718 and ends at the distance 722. In some examples, the movement of the inductance coil 708 may cause a change in the electrical characteristics of the inductance coil. This change may be related to the speed, distance, acceleration, or any other characteristic of the movement. For example, if the object pushes down on the reference surface 702 with a certain force, the capacitance module may accelerate downward at a certain speed. The speed at which the capacitance module accelerates may determine, at least in part, the change in the magnitude of the magnetic field interacting with the inductance coil.

In this example, the object 716 is a finger, but in other examples, the object may be a stylus, a palm, or any other appropriate object that may exert a force on the surface. In this example, the object applied a pressure input on the reference surface 702, but in other examples, the object may apply the pressure input to another surface of the capacitance module, an area around the reference surface, or any other area that may cause the capacitance module to be displaced. In this example, the substrates of the capacitance module are next to each other before the pressure input occurs, but in other examples, an air gap may be present between two or more of the substrates. In some cases, a pressure input on the reference surface 702 may displace the substrate on which the inductance coil 710 is disposed.

Figure 8:
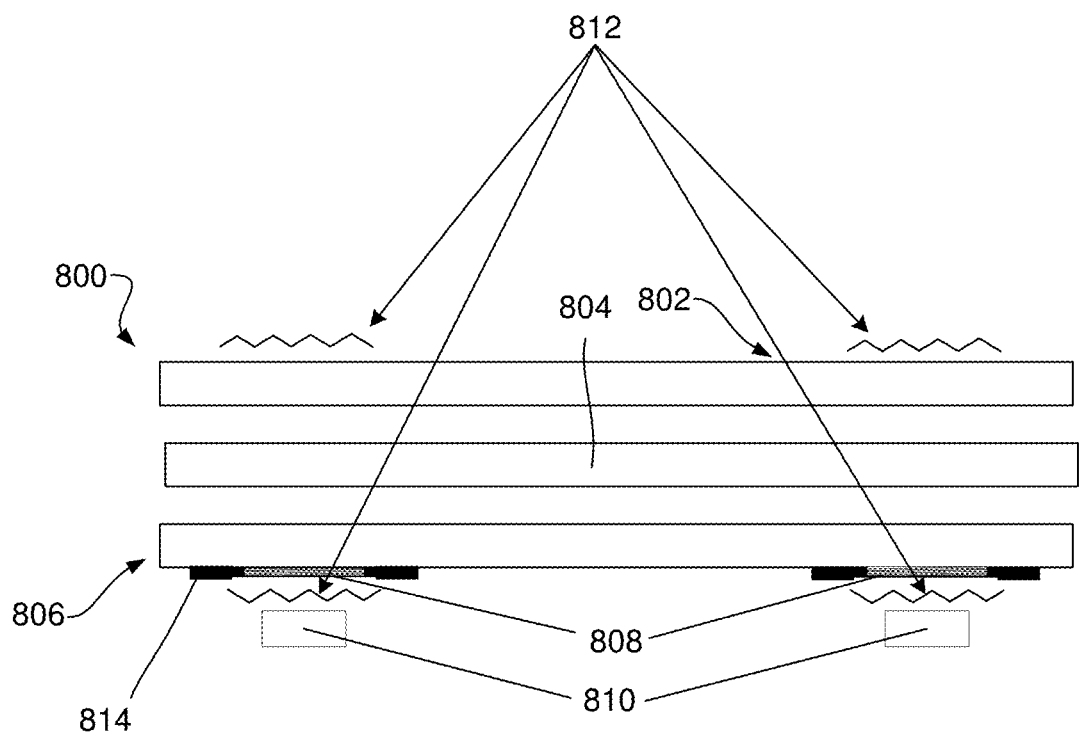
FIG. 8 depicts an example of providing a haptic response in accordance with the disclosure.

FIG. 8 depicts an example of providing a haptic response. A capacitance module 800 includes a reference surface 802, a first substrate 804, and a second substrate 806. The first substrate 804 may be positioned between the reference surface 802 and the second substrate 806. The substrate 804 may have electrodes that are a part of a capacitance circuit. A set of inductance coils 808 and coil shields 814 may be disposed on a side of the second substrate 806. A set of magnets 810 may be positioned so that they may interact with the set of inductance coils 808 to produce a haptic response 812.

In the depicted example, an electrical signal may be applied to the set of inductance coils 808 to produce the haptic response 812. In some examples, the set of magnets 810 may be fixed on a substrate not connected to the capacitance module 800. In other examples, the set of magnets may be fixed to a system that is mechanically attached to the capacitance module 800. In some examples, the haptic response 812 may be increased with an oscillating enhancement mechanism. In some examples, the oscillating enhancement mechanism may be connected to the set of magnets 810. In other examples, the oscillating enhancement mechanism may be connected to a component of the capacitance module 800.

In an example where an oscillating enhancement mechanism is used, an electrical signal may be applied to the set of inductance coils 808 that may cause the capacitance module 800 to oscillate at a certain frequency. In such an example, the certain frequency may be a frequency that causes the intensity of the oscillation to be larger than an oscillation at a different frequency. This frequency may be determined, at least in part, with the mass of a component, the combined mass of multiple components, the relative position of components, the elasticity of the oscillating enhancement mechanism, electromagnetic properties of one or more components or a combination thereof.

In some examples, the haptic response 812 may be a single oscillation of the capacitance module 800. In other examples, the haptic response may have multiple oscillations. In some examples, the haptic response 812 may have oscillations with different intensities, frequencies, durations, or a combination thereof. In some examples, the haptic response 812 may have oscillations separated by absences of oscillations.

Figure 9:
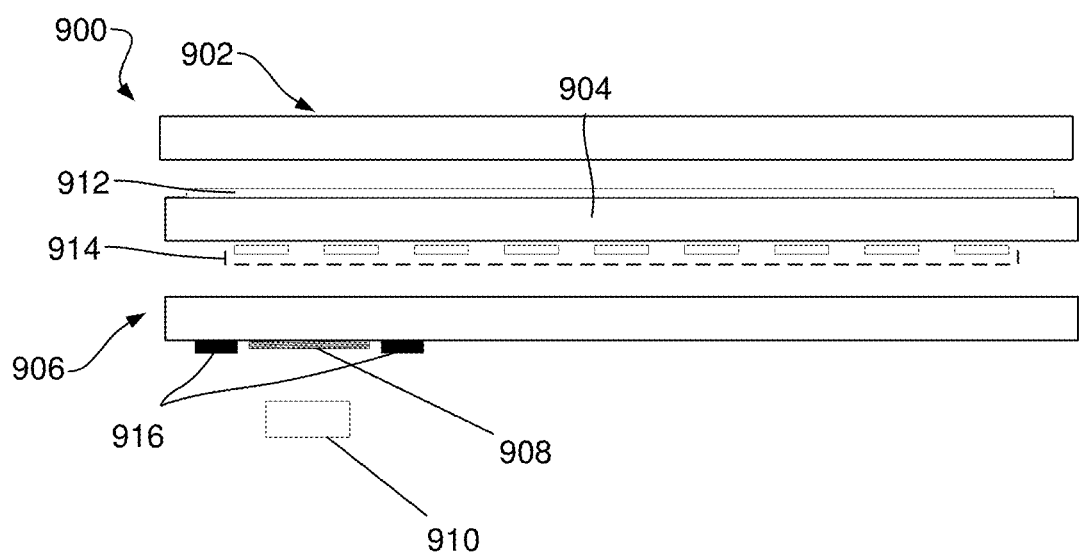
FIG. 9 depicts an example of a capacitance module and a magnet in accordance with the disclosure.

FIG. 9 depicts an example of a capacitance module 900. The capacitance module 900 may include a reference surface 902, a first substrate 904, and a second substrate 906. The first substrate 904 may be located between the reference surface 902 and the second substrate 906. The first substrate 904 may include a first set 912 of electrodes on a first surface and a second set 914 of electrodes on a second surface. The first set 912 and the second set 914 of electrodes may form a capacitance circuit. The second substrate includes an inductance coil 908 and a coil shield 916. A magnet 910 is positioned adjacent to the inductance coil 916 on the second substrate 906.

While the capacitance module 600 depicted in FIG. 6b includes two inductance coils 606 and two coil shields 612, in other examples, a capacitance module may include a fewer number of coils and coil shields or a greater number of coils and coil shields. In this example, the capacitance module 900 depicted in FIG. 9 includes only one inductance coil 908 and coil shield 916. The number of inductance coils and coil shields within a capacitance module may be determined by several factors, including price, size, feature specifications, and/or other factors.

Figure 10:
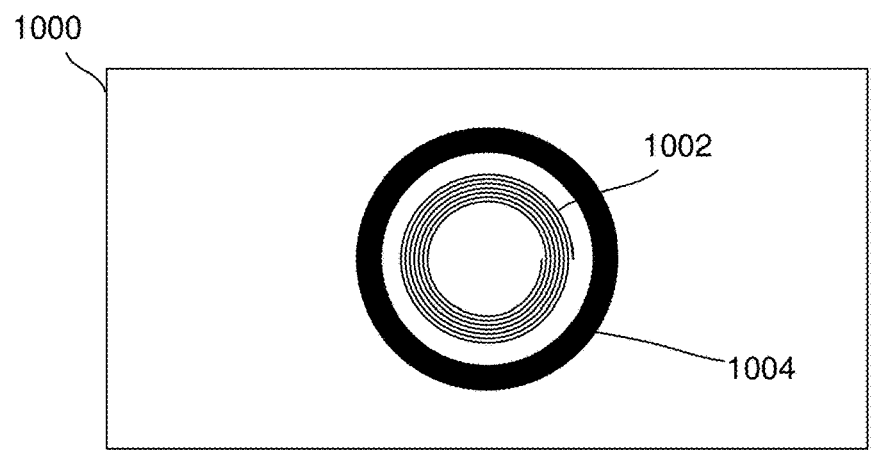
FIG. 10 depicts an example of an inductance coil and a coil shield in accordance with the disclosure.

FIG. 10 depicts an example of an inductance coil 1002 and coil shield 1004. The inductance coil 1002 and coil shield 1004 are disposed on a substrate 1000.

In some cases, as the magnetic field of the inductance coil 1002 changes during the process of providing a haptic response or detecting a pressure input, an eddy current may be induced within the coil shield 1004. The magnitude of an eddy current in a coil shield may inversely correspond to change in the magnetic field of an inductance coil. In some cases, an eddy current may generate significant amounts of heat. In some cases, an eddy current may generate a magnetic field which opposes the magnetic field of an inductance coil. These effects may reduce the durability and/or effectiveness of a capacitance module.

The material of a coil shield may reduce the heat and magnetic field generated by eddy currents induced within the coil shield. In some cases, coil shields made of laminated materials may restrict the flow of eddy currents through the coil shields. Such laminated materials may include portions of conductive metal such as copper, aluminum, or silver separated by portions of a non-conductive material such as silicon.

In some cases, the shape of a coil shield may reduce the heat and magnetic field generated by eddy currents induced within the coil shield. In some cases, coil shields disposed in non-continuous structures such as segmented rings, c-rings, and/or other discontinuous shapes may restrict the flow of eddy currents through the coil shields. In some cases, coil shields disposed in non-circular structures may align the coil shields more effectively with magnetic flux lines, reducing conditions favorable for large eddy currents. In some cases, coil shields disposed of multiple barriers may restrict the flow of eddy currents through the coil shields.

The coil shield 1004 depicted in FIG. 10 is disposed in a circular shape and/or continuous shape.

Figure 11:
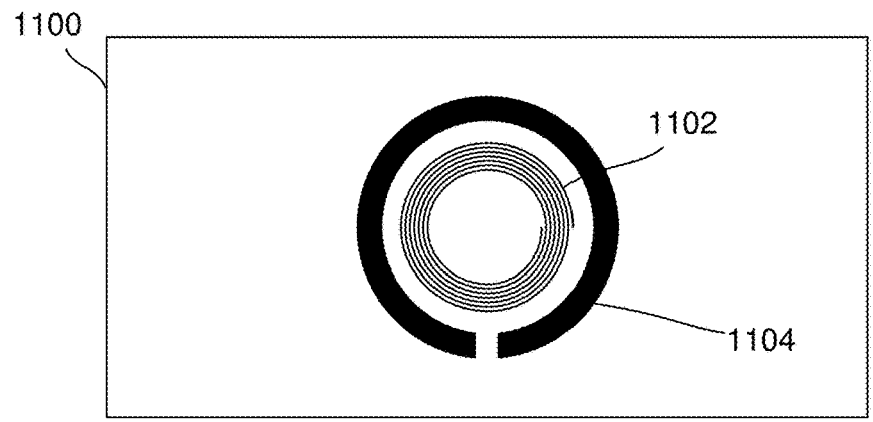
FIG. 11 depicts an example of an inductance coil and a coil shield in accordance with the disclosure.

FIG. 11 depicts an induction coil 1102 and coil shield 1104 on a substrate 1100. In this example, the coil shield 1104 has a c-ring shape. The shape of the coil shield 1104 may restrict the flow of eddy currents through the coil shield, which may reduce the heat and magnetic fields associated with the eddy currents.

Figure 12:
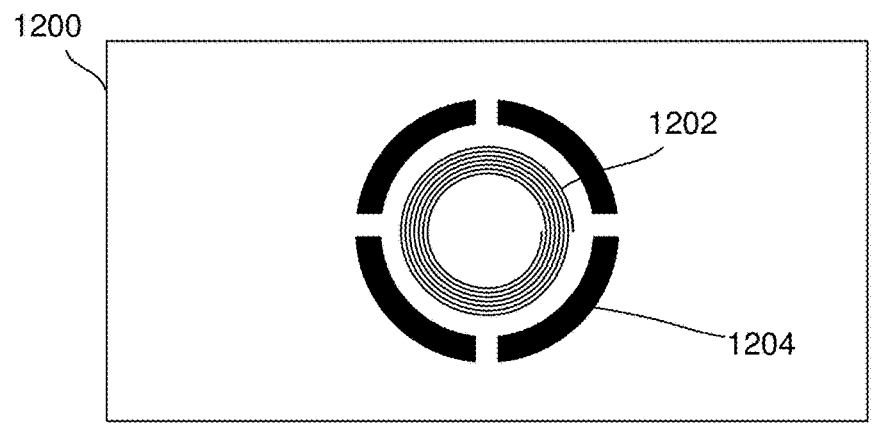
FIG. 12 depicts an example of an inductance coil and a coil shield in accordance with the disclosure.

FIG. 12 depicts an induction coil 1202 and coil shield 1204 on a substrate 1200. In this example, the coil shield 1204 is disposed in multiple segments. The shape of the coil shield 1204 may restrict the flow of eddy currents through the coil shield even more, which may reduce the heat and magnetic fields associated with the eddy currents.

Figure 13:
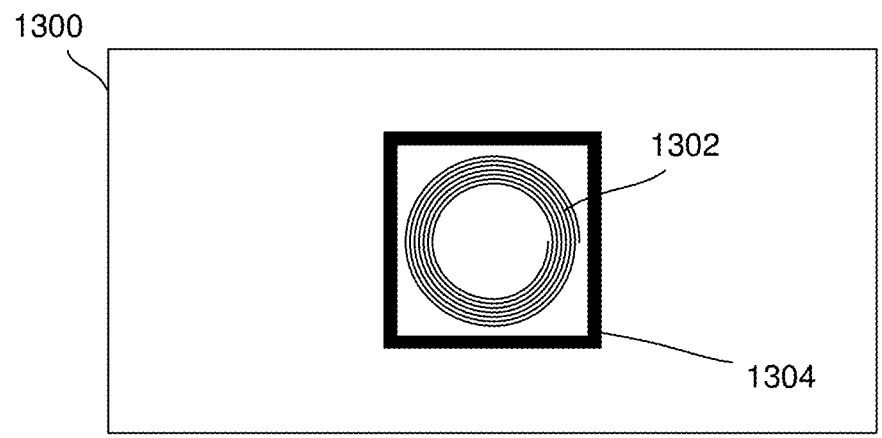
FIG. 13 depicts an example of an inductance coil and a coil shield in accordance with the disclosure.

FIG. 13 depicts an induction coil 1302 and coil shield 1304 on a substrate 1300. In this example, the coil shield 1304 has a square shape. The shape of the coil shield 1304 may restrict the flow of eddy currents through the coil shield, which may reduce the heat and magnetic fields generated by the eddy currents.

Figure 14:
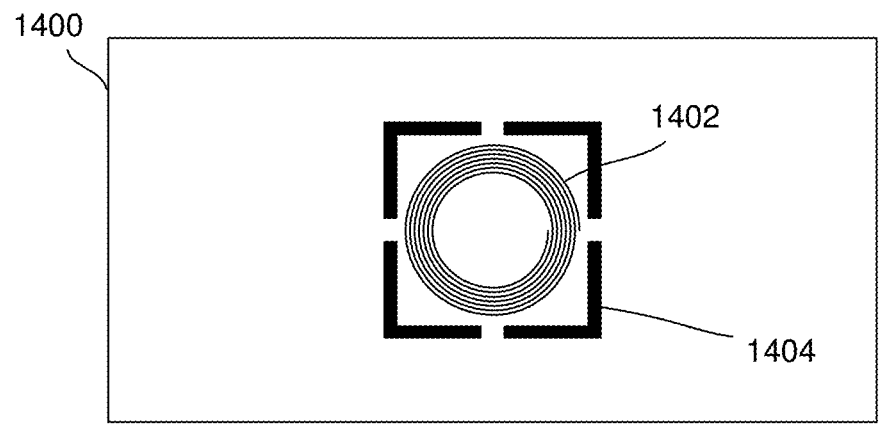
FIG. 14 depicts an example of an inductance coil and a coil shield in accordance with the disclosure.

FIG. 14 depicts an induction coil 1402 and coil shield 1404 on a substrate 1400. In this example, the coil shield 1404 has a square shape disposed in multiple segments. The shape of the coil shield 1404 may restrict the flow of eddy currents through the coil shield, which may reduce the heat and magnetic fields generated by the eddy currents.

Figure 15:
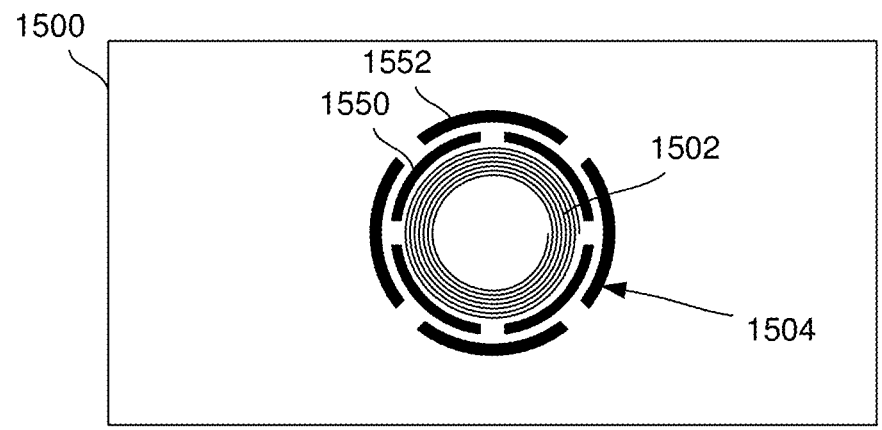
FIG. 15 depicts an example of an inductance coil and a coil shield in accordance with the disclosure.

FIG. 15 depicts an induction coil 1502 and coil shield 1504 on a substrate 1500. In this example, the coil shield 1504 has a circular shape disposed in multiple segments and multiple barriers. The shape of the coil shield 1504 may restrict the flow of eddy currents through the coil shield, which may reduce the heat and magnetic fields generated by the eddy currents. In this example, the coil shield includes a pair of segmented concentric rings. The gaps between the segments of the inner ring 1550 may be offset from the gaps formed by the segments of the outer ring 1552.

Figure 16:
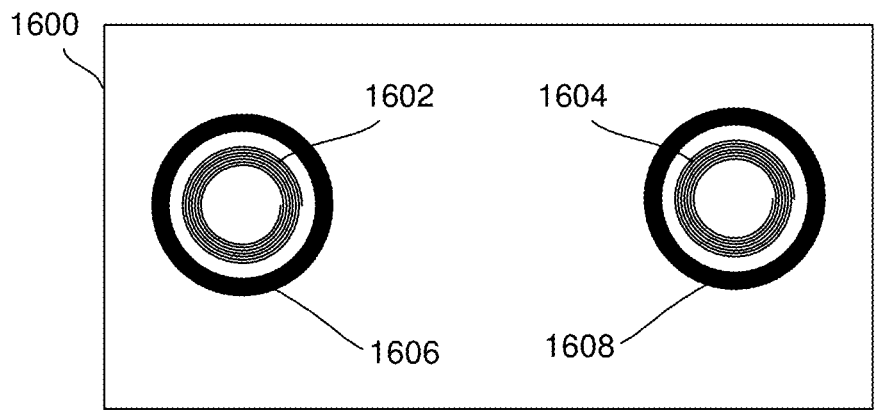
FIG. 16 depicts an example of an arrangement of inductance coils and coil shields in accordance with the disclosure.

FIG. 16 depicts an arrangement of induction coils and coil shields. A first induction coil 1602, a second induction coil 1604, a first coil shield 1606, and a second coil shield 1608 are disposed on a substrate 1600. While the substrate 1600 depicted in this example includes two induction coils and coil shields, a substrate may include a greater number of induction coils and coil shields or a fewer number of induction coils and coil shields. In some examples, a capacitance module which incorporates more induction coils and coil shields may be more effective in detecting pressure inputs and generating haptic responses compared to a capacitance module which incorporates fewer induction coils and coil shields.

Figure 17:
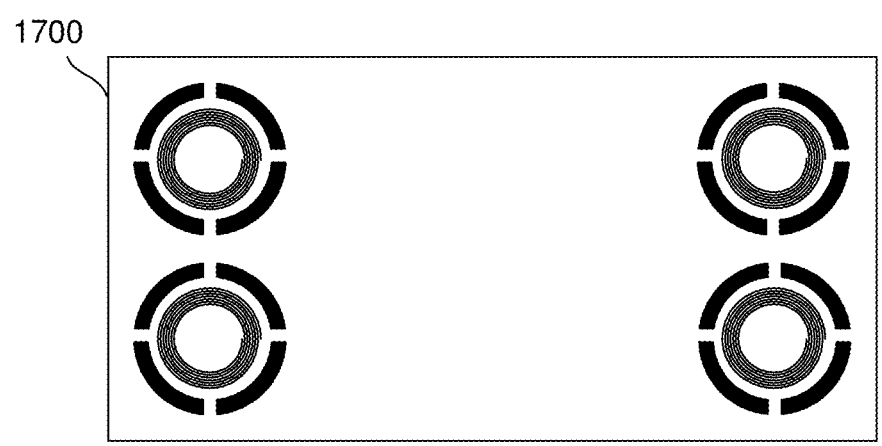
FIG. 17 depicts an example of an arrangement of inductance coils and coil shields in accordance with the disclosure.

FIG. 17 depicts an arrangement of induction coils and coil shields. In this example, a substrate 1700 includes four induction coils and coil shields.

Figure 18A:
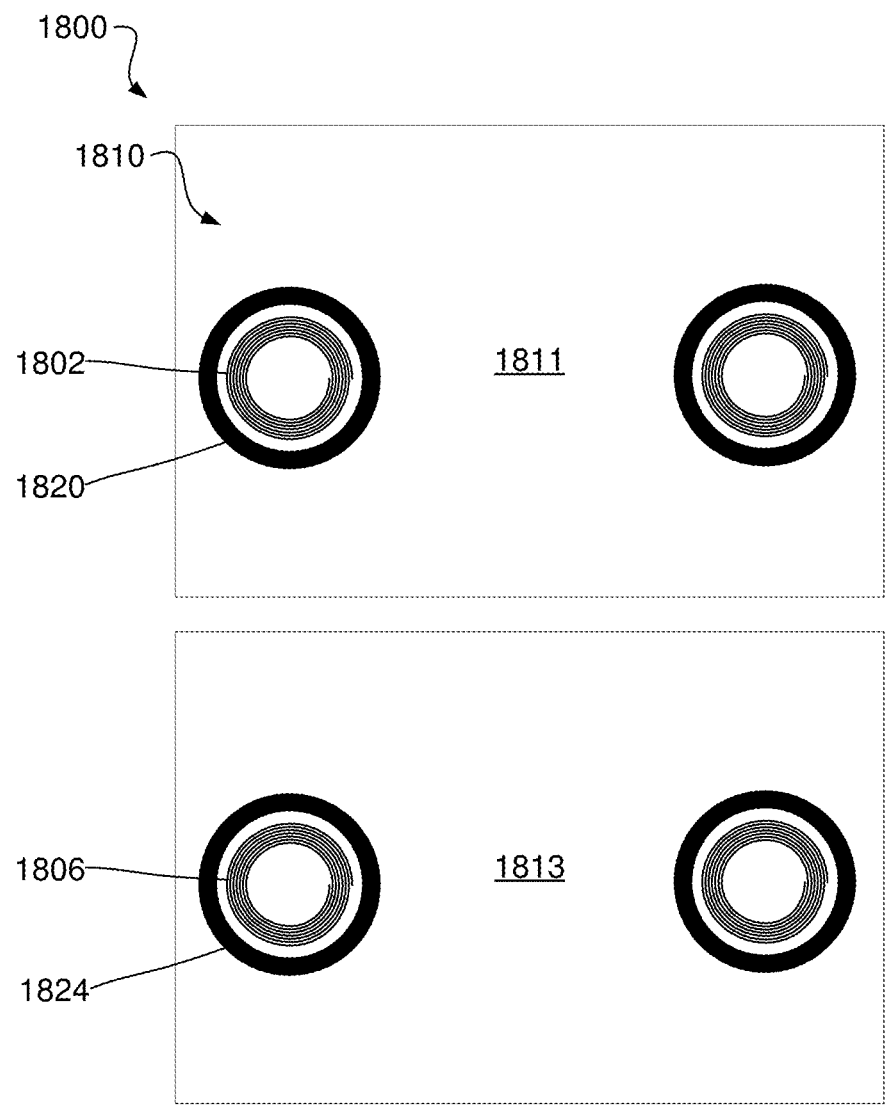
FIG. 18A depicts an example of connections between portions of inductance coils and coil shields in accordance with the disclosure.
Figure 18B:
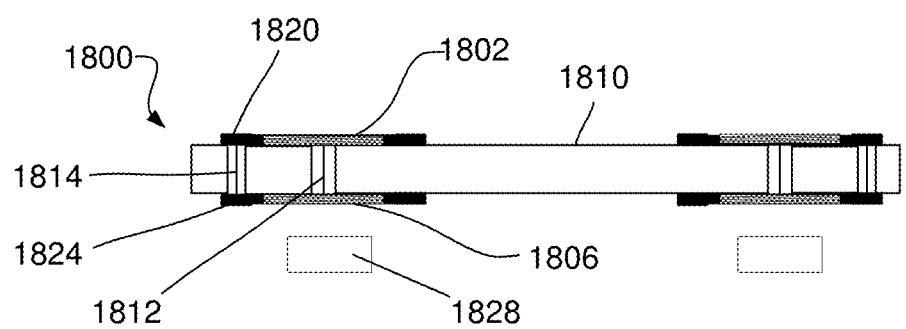
FIG. 18B depicts an example of connections between portions of inductance coils and coil shields in accordance with the disclosure.

FIGS. 18A and 18B depict examples of connections between portions of inductance coils and coil shields. A capacitance module 1800 includes a substrate 1810 with a first side 1811 and a second side 1813. A first portion 1802 of an inductance coil and a first portion 1820 of a coil shield are disposed on the first side 1811 of the substrate 1810. A second portion 1806 of the inductance coil and a second portion 1824 of the coil shield are disposed on the second side 1813 of the substrate 1810. The first portion 1802 and the second portion 1806 of the inductance coil are electrically connected through the substrate 1810 by a coil via 1812. The first portion 1820 and the second portion 1824 of the coil shield are electrically connected through the substrate 1810 by a shield via 1814. A magnet 1828 is positioned adjacent to the second portion 1806 of the inductance coil.

In this example, the coil via 1812 and shield via 1814 pass through the substrate 1810. In other examples a coil via and/or shield via may pass through a substrate and/or dielectric materials between the substrates of a capacitance module.

In this example, the coil via 1812 and the shield via 1814 connect the first portion 1802 and second portion 1806 of the inductance coil and the first portion 1820 and the second portion 1824 of the coil shield respectively with a single connection. In other examples, portions of inductance coils and/or shield coils may be connected by multiple connections through multiple vias. In such examples, the multiple connections may reduce the heat or magnetic fields generated by the connections. In such examples, the multiple connections may reduce the energy required to drive the inductance coils. In some examples, the lower heat generation from the multiple connection points may assist in maintaining an overall lower temperature within the capacitance module resulting in improved life of the capacitance module's components. Further, the lower amounts of energy needed to operate the capacitance module may result in lower overall energy requirements to operate the capacitance module.

Figure 19:
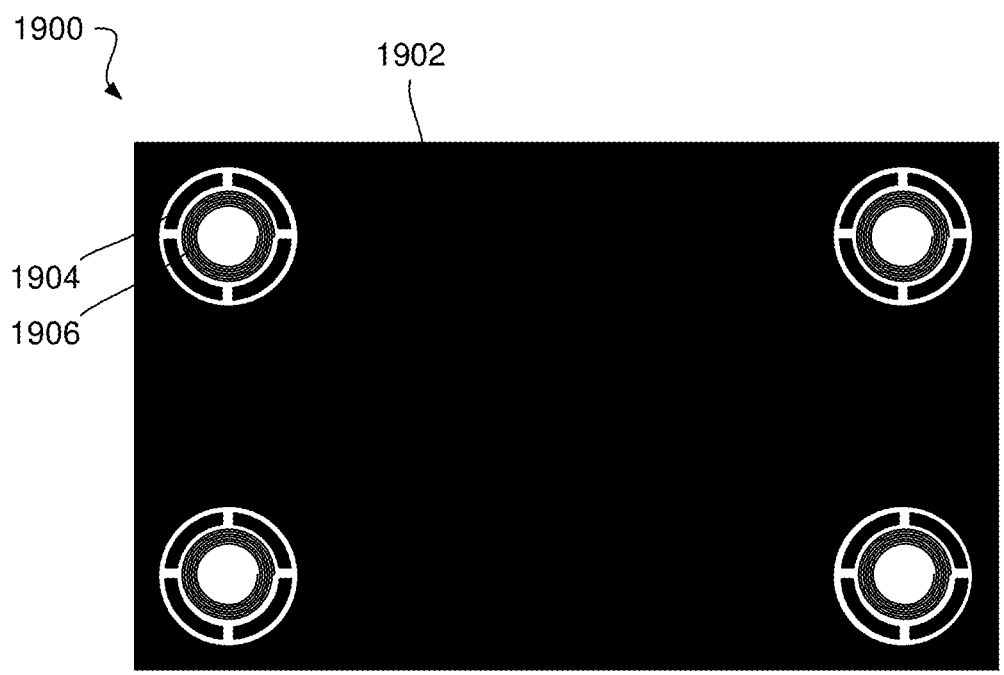
FIG. 19 depicts an example of a shield layer in accordance with the disclosure.

FIG. 19 depicts an example of a shield layer 1900. The shield layer includes a shielding portion 1902, a set of inductance coils 1904 and a set of coil shields 1906. In some examples, it may be desirable to dispose a portion of an inductance coil on the shield layer of a capacitance module. In particular, disposing a portion of an inductance coil on the shield layer of a capacitance module may allow for more compact capacitance module design.

In some examples, an inductance coil may be shielded by a coil shield that is electrically independent from the greater shielding portion of a shield layer. In such examples, electrical independence between a coil shield and shield layer may reduce the propagation of eddy currents throughout the shield layer, improving the durability and longevity of the capacitance module. In other examples, an inductance coil may be shielded by the shielding portion of a shield layer itself, omitting a coil shield. In such examples, the omission of a coil shield may reduce the manufacturing complexity of the shield layer.

In the example depicted in FIG. 19, the inductance coils 1906 are each shielded by coil shields 1904 which are electrically independent from the shielding portion 1902 of the shield layer. The electrical independence between the coil shield 1904 and the shielding portion 1902 may reduce the propagation of eddy currents throughout the shield layer 1900.

Figure 20:
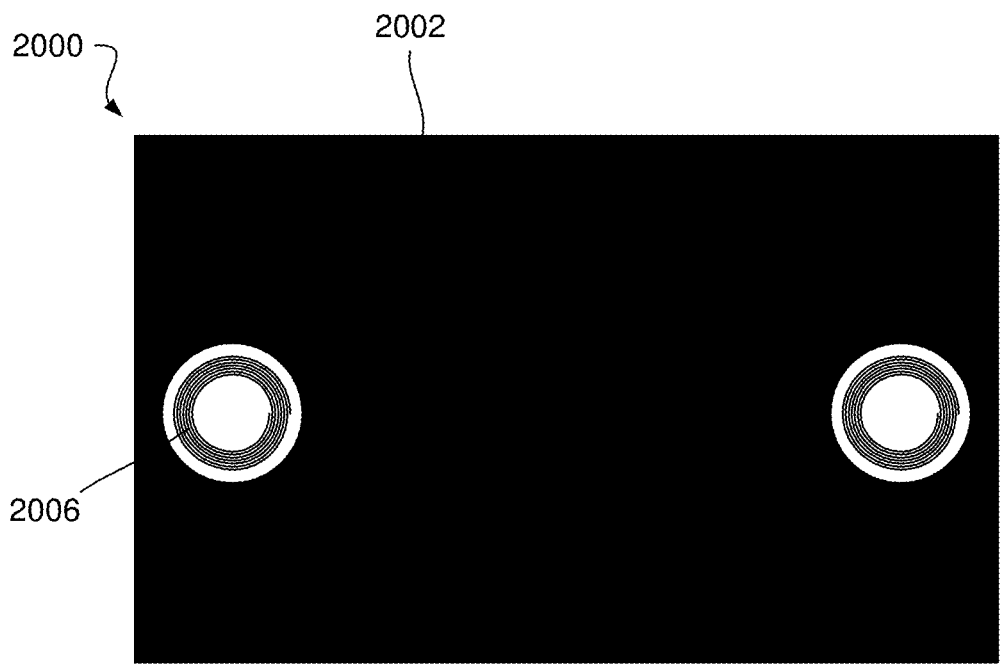
FIG. 20 depicts an example of a shield layer in accordance with the disclosure.

FIG. 20 depicts an example of a shield layer 2000. The shield layer includes a set of inductance coils 2006 and a shielding portion 2002. In this example, the shield coils are the shielding portion 2002 of the shield layer 2000.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   a touch electrode on a first surface of the capacitance module;
   a first portion of an inductance coil deposited on a second surface of the capacitance module;
   a second portion of the inductance coil deposited on a third surface of the capacitance module;
   a first coil shield deposited on the second surface of the capacitance module; and
   a second coil shield deposited on the third surface of the capacitance module;
   wherein the first portion of the inductance coil and the second portion of the inductance coil are electrically connected;
   wherein the inductance coil is positioned to interact with a magnet adjacent to the inductance coil;
   wherein the first coil shield and the second coil shield are positioned to reduce electromagnetic interference between the inductance coil and other electronic components of the capacitance module.

2. The capacitance module of claim 1, wherein the magnet is configured to provide a haptic effect on the capacitance module by moving the inductance coil with a change in a magnetic force.

3. The capacitance module of claim 1, wherein at least one of the first coil shield and the second coil shield is arranged in a ring-like structure around the inductance coil.

4. The capacitance module of claim 3, wherein the ring-like structure is a discontinuous ring.

5. The capacitance module of claim 1, wherein at least one of the first coil shield and the second coil shield is deposited in at least two segments.

6. The capacitance module of claim 1, further comprising processing resources located on the second surface of the capacitance module; wherein the first coil shield is located between the first portion of the inductance coil and the processing resources.

7. The capacitance module of claim 1, further comprising a controller and memory;
   the memory having programmed instructions that, when executed, cause the controller to detect an applied force on the capacitance module by measuring a change in a distance between the inductance coil and the magnet.

8. The capacitance module of claim 1, further comprising a controller and memory;
   the memory having programmed instructions that, when executed, cause the controller to impose a varying signal on the inductance coil that interacts with the magnet to provide a haptic effect on the capacitance module.

9. The capacitance module of claim 1, wherein the first surface is on a first substrate;
   the second surface is on a second substrate;
   the third surface is also on the second substrate; and
   another coil shield on a third substrate, the third substrate being located between the first surface and the second surface.

10. The capacitance module of claim 1, wherein at least one of the first coil shield and the second coil shield is comprised of a conductive material.

11. The capacitance module of claim 1, wherein the first coil shield and the second coil shield are aligned with each other while being on different layers of the capacitance module.

12. The capacitance module of claim 1, wherein the first coil shield is electrically connected to the second coil shield.

13. The capacitance module of claim 1, wherein the first coil shield and the second coil shield are positioned to focus electromagnetic energy of the inductance coil towards the magnet.

14. The capacitance module of claim 1, further comprising:
   a third portion of the inductance coil deposited on a fourth surface of the capacitance module; and
   another coil shield is deposited on the fourth surface of the capacitance module;

wherein the another coil shield is positioned to reduce the electromagnetic interference between the inductance coil and the other electronic components of the capacitance module.

15. The capacitance module of claim 1, wherein the first portion of the inductance coil and the second portion of the inductance coil are connected in series.

16. The capacitance module of claim 1, wherein the first portion of the inductance coil and the second portion of the inductance coil are connected in parallel.

17. The capacitance module of claim 1, wherein the inductance coil and at least one of the first coil shield and the second coil shield are located near a corner of the second surface.

18. The capacitance module of claim 1, wherein the first coil shield is electrically connected to the second coil shield.

19. A capacitance module, comprising:
at least one touch electrode on a first surface of the capacitance module;
a first inductance coil;
a second inductance coil; and
wherein a first portion of the first inductance coil is deposited on a second surface of the capacitance module and a second portion of the first inductance coil is deposited on a third surface of the capacitance module;
wherein a first portion of the second inductance coil is deposited on the second surface of the capacitance module and a second portion of the second inductance coil is deposited on the third surface of the capacitance module;
a first coil shield is deposited on the second surface and a second coil shield is deposited on the third surface of the capacitance module, the first coil shield and the second coil shield being positioned to reduce electromagnetic interference between the first inductance coil, the second inductance coil, and other electronic components of the capacitance module;
wherein the first inductance coil is positioned to interact with a first magnet adjacent to the first inductance coil; and
wherein the second inductance coil is positioned to interact with a second magnet adjacent to the second inductance coil.

* * * * *